US012732343B2

(12) United States Patent
Xu et al.

(10) Patent No.: US 12,732,343 B2
(45) Date of Patent: Sep. 8, 2026

(54) ACCOUNT OPENING METHODS, SYSTEMS, AND APPARATUSES

(71) Applicant: Alipay (Hangzhou) Information Technology Co., Ltd., Hangzhou (CN)

(72) Inventors: Dengwei Xu, Hangzhou (CN); Bingying Zhu, Hangzhou (CN); Xianjun Cui, Hangzhou (CN); Zhi Xin, Hangzhou (CN); Xiaofei Wan, Hangzhou (CN); Chao Wu, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 87 days.

(21) Appl. No.: 18/528,290

(22) Filed: Dec. 4, 2023

(65) Prior Publication Data

US 2024/0106633 A1 Mar. 28, 2024

Related U.S. Application Data

(63) Continuation of application No. PCT/CN2022/104977, filed on Jul. 11, 2022.

(30) Foreign Application Priority Data

Jul. 16, 2021 (CN) ........................ 202110808788.9

(51) Int. Cl.
*H04L 9/08* (2006.01)

(52) U.S. Cl.
CPC .......... *H04L 9/0825* (2013.01); *H04L 9/0869* (2013.01)

(58) Field of Classification Search
None
See application file for complete search history.

(56) References Cited

U.S. PATENT DOCUMENTS 11,336,435 B2 * 5/2022 Shen ...................... G06K 19/10
11,349,644 B1 * 5/2022 Stapleton ............ G06F 21/6245
(Continued)

FOREIGN PATENT DOCUMENTS

CN 106327184 1/2017
CN 106506472 3/2017
(Continued)

OTHER PUBLICATIONS

International Preliminary Report on Patentability in Appln. No. PCT/CN2022/104977, mailed on Jan. 25, 2024, 11 pages (with English translation).
(Continued)

*Primary Examiner* — Bassam A Noaman
(74) *Attorney, Agent, or Firm* — Fish & Richardson P.C.

(57) ABSTRACT

Embodiments of this specification provide account opening methods, systems, and apparatuses. An example method is performed by a terminal device that includes a trusted execution environment (TEE) and an encryption hardware-based secure element. When it is detected that a current user initiates an account opening request, the terminal device obtains a user public key of the current user in the TEE, and signs a user public key by using a predetermined manufacturer private key, to obtain a user certificate; signs, in the secure element by using a user private key corresponding to the user public key, opening information; generates an opening request in the TEE based on at least the user certificate and signed opening information; and, in the TEE, generates an opening request packet based on the opening request, and sends the opening request packet to a server that opens an account based on the opening request packet.

20 Claims, 6 Drawing Sheets

(56) References Cited

U.S. PATENT DOCUMENTS

| | | | | |
|---|---|---|---|---|
| 11,785,114 | B1 * | 10/2023 | Fregly | H04L 9/0894 |
| 2002/0042812 | A1 * | 4/2002 | Spencer | C07K 14/705 709/223 |
| 2018/0278422 | A1 * | 9/2018 | Young | G06Q 10/02 |
| 2019/0095910 | A1 * | 3/2019 | Gumowski | G06Q 20/383 |
| 2019/0122191 | A1 | 4/2019 | Filipiak et al. | |
| 2020/0235945 | A1 | 7/2020 | Li et al. | |
| 2020/0265418 | A1 | 8/2020 | Lee et al. | |
| 2021/0306157 | A1 * | 9/2021 | Wattiau | H04L 9/3265 |

FOREIGN PATENT DOCUMENTS

| | | | |
|---|---|---|---|
| CN | 107464184 | | 12/2017 |
| CN | 108229956 | | 6/2018 |
| CN | 109559105 | | 4/2019 |
| CN | 110086609 | | 8/2019 |
| CN | 110677418 | | 1/2020 |
| CN | 111125705 | | 5/2020 |
| CN | 111181720 | | 5/2020 |
| CN | 111401901 | | 7/2020 |
| CN | 111931158 | | 11/2020 |
| CN | 112202794 | | 1/2021 |
| CN | 112669021 | | 4/2021 |
| CN | 113592484 | | 11/2021 |
| EP | 3487142 | | 5/2019 |
| EP | 3866385 | A1 | 8/2021 |
| EP | 4024311 | A1 | 7/2022 |
| IN | 2019-47020080 | | 5/2019 |
| WO | WO 2017/175926 | | 10/2017 |
| WO | WO 2023/284691 | | 1/2023 |

OTHER PUBLICATIONS

International Search Report and Written Opinion in Appln. No. PCT/CN2022/104977, mailed on Sep. 26, 2022, 13 pages (with English translation).

Extended European Search Report in European Appln. No. 22841327.4, mailed on Aug. 19, 2024, 9 pages.

* cited by examiner

ACCOUNT OPENING METHODS, SYSTEMS, AND APPARATUSES

CROSS-REFERENCE TO RELATED APPLICATIONS

This application is a continuation of PCT Application No. PCT/CN2022/104977, filed on Jul. 11, 2022, which claims priority to Chinese Patent Application No. 202110808788.9, filed on Jul. 16, 2021, and each application is hereby incorporated by reference in its entirety.

TECHNICAL FIELD

This specification relates to the field of data security technologies, and in particular, to account opening methods, systems, and apparatuses.

BACKGROUND

Innovative payment in offline scenarios has attracted increasing attention from the country and various institutions, and therefore, hardware wallets receive more attention. The biggest characteristic of the hardware wallet is that digital objects change from "cloud" to "end". Correspondingly, an opening stage of the hardware wallet, namely, opening of a hardware wallet account, becomes a crucial risk point.

How to provide a trusted method for opening a hardware wallet account becomes a problem that urgently needs to be solved.

SUMMARY

One or more embodiments of this specification provide account opening methods, systems, and apparatuses, to improve account opening credibility.

According to a first aspect of this specification, an account opening method is provided. The method is applied to a terminal device, the terminal device includes a trusted execution environment (TEE) and an encryption hardware-based secure element, and the method includes the following: obtaining a user public key of a current user in the TEE; signing the user public key in the TEE by using a predetermined manufacturer private key, to obtain a user certificate; signing opening information in the secure element by using a user private key corresponding to the user public key, where the opening information is generated based on device information of the terminal device; generating an opening request in the TEE based on at least the user certificate and signed opening information; and in the TEE, generating an opening request packet based on the opening request, and sending the opening request packet to a server that opens an account, so that the server opens an account for the current user based on the opening request packet.

In some feasible methods, the obtaining a user public key of a current user includes the following: generating a corresponding user public/private key pair in the TEE by using a device public/private key pair generated in advance and a user identifier of the current user, where the user public/private key pair includes the user public key and the user private key corresponding to the user public key.

In some feasible methods, the generating an opening request includes the following: obtaining a manufacturer digital certificate, where the manufacturer digital certificate includes a manufacturer public key corresponding to the manufacturer private key; and generating the opening request based on the user certificate, the manufacturer digital certificate, and the signed opening information.

In some feasible methods, the generating an opening request packet based on the opening request includes the following: encrypting the opening request in the TEE by using a symmetric key, to obtain an encrypted opening request; encrypting the symmetric key by using a server public key of the server, to obtain a first encrypted key after encryption; and generating the opening request packet based on the encrypted opening request and the first encrypted key.

In some feasible methods, the method further includes the following: randomly generating the symmetric key by using a predetermined random key generation method.

In some feasible methods, the method further includes the following: obtaining a predetermined server public key agreed upon with the server from the TEE; or obtaining the server public key from the server by using a predetermined key negotiation algorithm.

In some feasible methods, the method further includes the following: obtaining an opening reply packet that is fed back by the server based on the opening request packet; and opening an account based on the opening reply packet.

In some feasible methods, the opening reply packet includes an opening reply ciphertext encrypted by using the symmetric key and a second encrypted key obtained by encrypting the symmetric key by using a server private key corresponding to the server public key; and the opening an account based on the opening reply packet includes the following: decrypting the second encrypted key by using the server public key, to obtain a symmetric key; when it is determined that the symmetric key obtained through decryption is the same as the symmetric key generated in advance in the TEE, decrypting the opening reply ciphertext by using the symmetric key, to obtain an opening reply plaintext; and opening an account based on the opening reply plaintext.

According to a second aspect of this specification, an account opening method is provided, including: The method is applied to a server, and includes the following: receiving an opening request packet sent by a terminal device based on a current user, where the opening request packet includes an opening request, the opening request includes a user certificate and signed opening information, the user certificate is obtained by signing a user public key of the current user by using a manufacturer private key predetermined in the terminal device, the signed opening information is obtained by signing opening information by using a user private key corresponding to the current user, and the opening information is generated based on device information of the terminal device; performing first verification on the user certificate by using a manufacturer public key corresponding to the manufacturer private key; if the first verification is passed, performing second verification on the signed opening information by using the user public key in the user certificate; and if the second verification is passed, determining an opening reply packet by using the device information in the opening information, and sending the opening reply packet to the terminal device, so that the terminal device opens an account based on the opening reply packet.

In some feasible methods, the opening request further includes a manufacturer digital certificate, and the manufacturer digital certificate includes the manufacturer public key corresponding to the manufacturer private key; and the performing first verification on the user certificate includes the following: performing third verification on the manufacturer digital certificate by using an obtained manufacturer root public key; and if the third verification is passed, performing first verification on the user certificate by using the manufacturer public key.

In some feasible methods, the opening request is an encrypted opening request obtained through encryption by using a symmetric key, and the opening request packet further includes a first encrypted key obtained by encrypting the symmetric key by using a server public key; and before the performing first verification on the user certificate, the method further includes the following: decrypting the first encrypted key by using a server private key corresponding to the server public key, to obtain the symmetric key; and decrypting the encrypted opening request by using the symmetric key, to obtain an opening request plaintext.

In some feasible methods, the determining an opening reply packet by using the device information in the opening information includes the following: determining an opening reply by using the device information; encrypting the opening reply by using the symmetric key, to obtain an opening reply ciphertext; encrypting the symmetric key by using the server private key, to obtain a second encrypted key after encryption; and forming the opening reply packet based on the opening reply ciphertext and the second encrypted key.

According to a third aspect of this specification, an account opening system is provided. The account opening system includes a terminal device and a server, the terminal device is configured to perform the method according to the first aspect, and the server is configured to perform the method according to the second aspect.

According to a fourth aspect of this specification, an account opening apparatus is provided. The apparatus is applied to a terminal device, the terminal device includes a trusted execution environment (TEE) and an encryption hardware-based secure element, and the apparatus includes: a first acquisition module, configured to obtain a user public key of a current user in the TEE; a first signature module, configured to sign the user public key in the TEE by using a predetermined manufacturer private key, to obtain a user certificate; a second signature module, configured to sign opening information in the secure element by using a user private key corresponding to the user public key, where the opening information is generated based on device information of the terminal device; a request generation module, configured to generate an opening request in the TEE based on at least the user certificate and signed opening information; and a generating and sending module, configured to: in the TEE, generate an opening request packet based on the opening request, and send the opening request packet to a server that opens an account, so that the server opens an account for the current user based on the opening request packet.

According to a fifth aspect of this specification, an account opening apparatus is provided. The apparatus is applied to a server, and includes: a packet receiving module, configured to receive an opening request packet sent by a terminal device based on a current user, where the opening request packet includes an opening request, the opening request includes a user certificate and signed opening information, the user certificate is obtained by signing a user public key of the current user by using a manufacturer private key predetermined in the terminal device, the signed opening information is obtained by signing opening information by using a user private key corresponding to the current user, and the opening information is generated based on device information of the terminal device; a first verification module, configured to perform first verification on the user certificate by using a manufacturer public key corresponding to the manufacturer private key; a second verification module, configured to: if the first verification is passed, perform second verification on the signed opening information by using the user public key in the user certificate; and a determining and sending module, configured to: if the second verification is passed, determine an opening reply packet by using the device information in the opening information, and send the opening reply packet to the terminal device, so that the terminal device opens an account based on the opening reply packet.

According to a sixth aspect of this specification, a computer-readable storage medium is provided. The computer-readable storage medium stores a computer program. When the computer program is executed on a computer, the computer is enabled to perform the terminal device-side account opening method provided in one or more embodiments of this specification.

According to a seventh aspect of this specification, a computing device is provided. The computing device includes a memory and a processor, the memory stores executable code, and when executing the executable code, the processor implements the terminal device-side account opening method provided in one or more embodiments of this specification.

According to an eighth aspect of this specification, a computer-readable storage medium is provided. The computer-readable storage medium stores a computer program, and when the computer program is executed on a computer, the computer is enabled to perform the server-side account opening method provided in one or more embodiments of this specification.

According to a ninth aspect of this specification, a computing device is provided. The computing device includes a memory and a processor, the memory stores executable code, and when executing the executable code, the processor implements the server-side account opening method provided in one or more embodiments of this specification.

According to the account opening methods and apparatuses provided in the embodiments of this specification, the opening information is signed in the secure element with highest security by using the user private key, so that accuracy and integrity of the opening information are ensured, and the opening information is prevented from being stolen and tampered with. In the TEE of the terminal device with relatively high security, the user public key is signed by using the predetermined manufacturer private key, to obtain the user certificate, the opening request packet is generated based on the signed opening information, and the opening request packet is sent to the server that opens an account in the TEE. The user certificate in the opening request packet can indicate that the opening request packet is from a real physical device produced by a device manufacturer, and processes of generating and sending the opening request packet are completed in the TEE and the secure element, so that a loss of related information in the packet generation process is reduced, and credibility of the opening request packet is improved to some extent, thereby improving credibility of opening a corresponding account.

BRIEF DESCRIPTION OF DRAWINGS

To describe technical solutions in embodiments of this specification more clearly, the following briefly describes the accompanying drawings needed for describing the embodiments. Clearly, the accompanying drawings in the following description merely show some embodiments of this specification, and a person of ordinary skill in the art can still derive other drawings from these accompanying drawings without creative efforts.

DESCRIPTION OF EMBODIMENTS

The following describes the technical solutions of the embodiments of this specification in detail with reference to the accompanying drawings.

Embodiments of this specification disclose account opening methods and apparatuses. The following describes an application scenario and an inventive concept of account opening. Details are as follows:

A hardware wallet usually relies on a real physical device, and opening of a hardware wallet account also relies on the real physical device. If an account opening device is an unreal physical device such as a fake mobile phone or a cloud mobile phone, a false hardware wallet is prone to appear, which endangers object security of a user who opens the account. To solve the above-mentioned problem, in a current account opening process, device information of a terminal device is obtained from an application (APP) level, an account opening request packet is assembled by using the device information, and the account opening request packet is sent to a server that opens an account, to apply for account opening. In this process, information acquisition at the APP level is prone to black-industry attacks and simulations, and the server still cannot effectively identify whether an account opening device is a real physical device.

Figure 1:
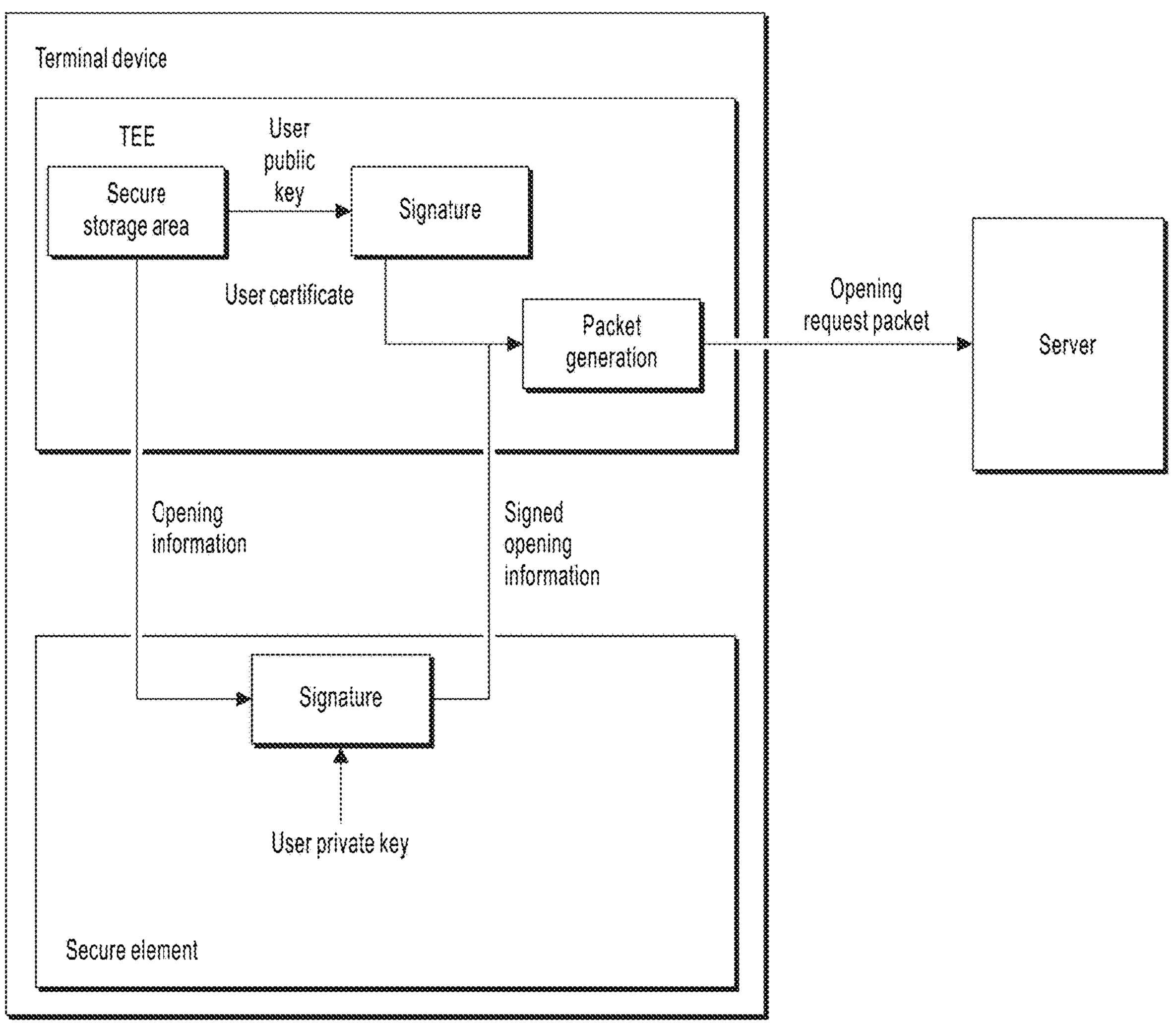
FIG. 1 is a schematic diagram illustrating an implementation framework, according to some embodiments disclosed in this specification.

In view of the above, some embodiments of this specification provide an account opening method, applied to a terminal device. FIG. 1 is a schematic diagram illustrating an implementation framework, according to some embodiments disclosed in this specification. The terminal device includes a trusted execution environment (TEE) and an encryption hardware-based secure element. When detecting that a current user initiates an account opening request, the terminal device obtains a user public key of the current user in the TEE, and signs a user public key by using a predetermined manufacturer private key, to obtain a user certificate; signs, in the secure element by using a user private key corresponding to the user public key, opening information generated based on device information of the terminal device; and in the TEE, generates an opening request packet based on at least the user certificate and signed opening information, and sends the opening request packet to a server that opens an account, so that the server opens an account for the current user based on the opening request packet. In some feasible methods, the terminal device can generate the opening information in the TEE or the secure element based on the device information.

An account that this solution is applicable to can be a hardware wallet account, or can be another account that relies on a physical device and has a relatively high security requirement, for example, an identity authentication account or a bank related account, etc.

The manufacturer private key is a private key stored on the terminal device by a manufacturer of the terminal device on a production line of the terminal device, and the manufacturer private key can prove, to some extent, that the terminal device is a real physical device produced by the manufacturer.

In the embodiments, the opening information is signed in the secure element with highest security by using the user private key, so that accuracy and integrity of the opening information are ensured, and the opening information is prevented from being stolen and tampered with. In the TEE of the terminal device with relatively high security, the user public key is signed by using the predetermined manufacturer private key, to obtain the user certificate, the opening request packet is generated based on the signed opening information, and the opening request packet is sent to the server that opens an account in the TEE. The user certificate in the opening request packet can indicate that the opening request packet is from a real physical device produced by a device manufacturer, and processes of generating and sending the opening request packet are completed in the TEE and the secure element, so that a loss of related information in the packet generation process is reduced, and credibility of the opening request packet is improved to some extent, thereby improving credibility of opening a corresponding account.

With reference to specific embodiments, the following describes in detail the account opening method provided in this specification.

Figure 2:
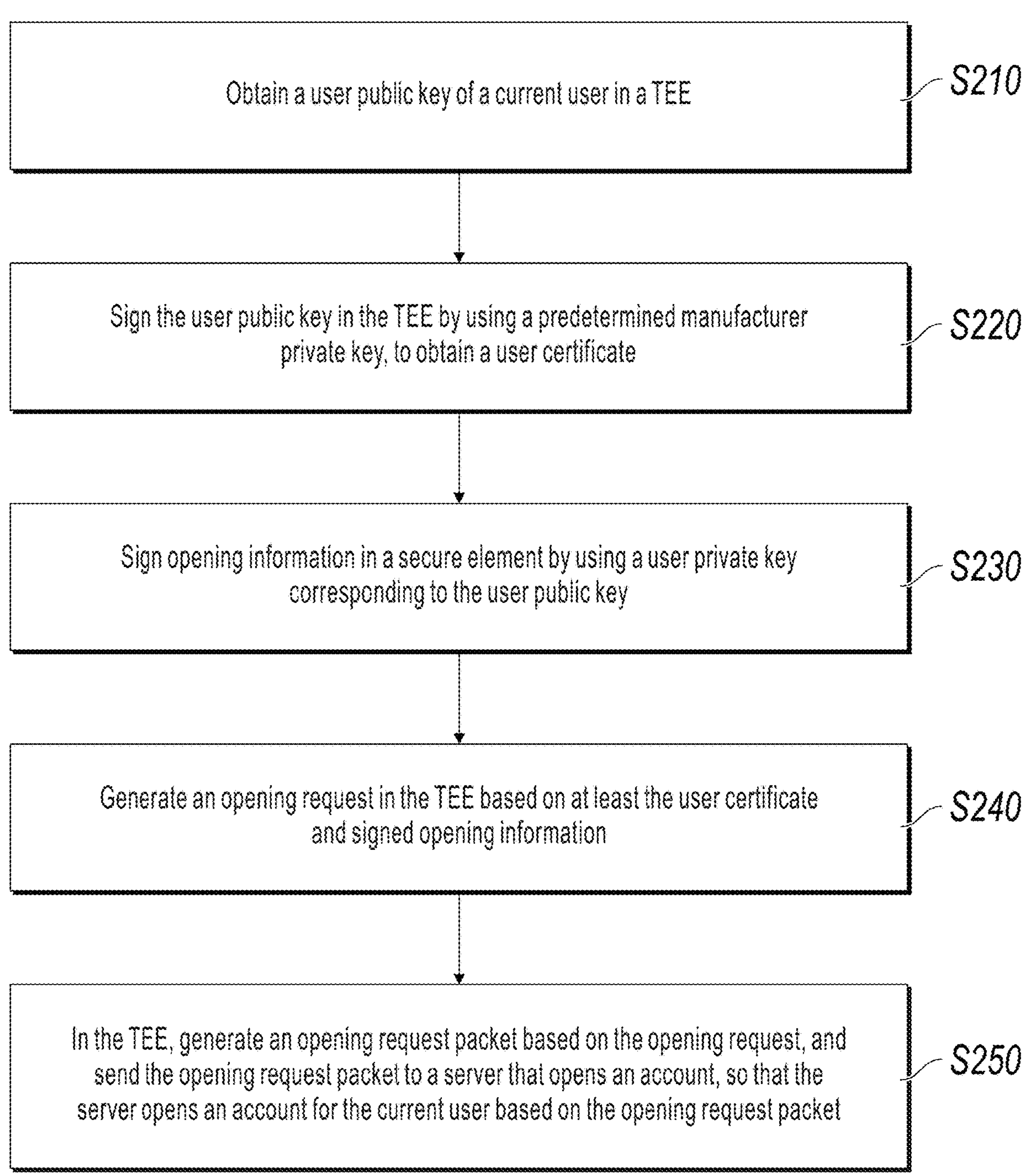
FIG. 2 is a schematic flowchart illustrating an account opening method, according to some embodiments of this specification.

FIG. 2 is a schematic flowchart illustrating an account opening method, according to this specification. The method is applied to a terminal device. The terminal device can be any device that has data computing, processing, and storage, for example, can be a computer, a mobile phone, a tablet computer, a smart watch, or a payment card. In some embodiments of this specification, the terminal device includes a trusted execution environment (TEE) and an encryption hardware-based secure element, and the method includes S210 to S250:

S210: Obtain a user public key of a current user in the TEE.

The trusted execution environment (TEE) is an area on a processor, for example, a central processing unit (CPU), of the terminal device. This area provides more secure space for data and code execution, and ensures confidentiality and integrity of data and code. By creating a small operating system that runs independently, the area implements secure storage, secure computing, and other data processing involving security and privacy.

The encryption hardware-based secure element can include but is not limited to a secure element (SE), and is usually provided in a chip form. The secure element includes an encryption/decryption logic circuit, so that external malicious resolution attacks can be prevented, and data security can be protected. It is worthwhile to note that the secure element is an environment where encryption protection is performed on data based on hardware, and therefore, the secure element has a higher security level than the TEE. In a case, the secure element can be a built-in secure element of the terminal device, or can be an external secure element of the terminal device. For example, when the terminal device is a mobile phone, the external secure element can be a secure element supported by a subscriber identity module (SIM) card.

In some implementations, when detecting that the current user initiates the account opening request, the terminal device obtains the user public key of the current user in the TEE. The account opening application can be initiated by the current user based on an account opening related application. The account opening related application can provide an account opening interface. The account opening interface displays an account opening button. The account opening button can be tapped to trigger the account opening application. Correspondingly, in a case, the terminal device further includes a rich execution environment (REE), and the account opening related application can run in the REE.

In some examples, the account opening related application can be ALIPAY Wallet. Correspondingly, the current user can be an ALIPAY user, and the account can be a hardware wallet account that needs to be opened for the ALIPAY user in ALIPAY Wallet.

In other examples, the account opening related application can be an application of bank x, the current user is a user of bank x, and the account can be a wallet account that bank x needs to open for the current user. The above-mentioned examples are only examples of this specification. The account opening related application can be another application that can open an account. The current user can be a user of the another application that can open an account, and the account is an account that the another application that can open an account needs to open for the current user.

In some embodiments of this specification, S210 can include the following: generating a corresponding user public/private key pair in the TEE by using a device public/private key pair generated in advance and a user identifier of the current user. The user public/private key pair includes the user public key and the user private key corresponding to the user public key.

When detecting that the current user initiates the account opening application, the terminal device obtains the device public/private key pair generated in advance and the user identifier of the current user in the TEE, and generates the corresponding user public/private key pair based on the device public/private key pair and the user identifier by using a key generation algorithm such as a national secret algorithm. The user identifier can be a user identity (ID) of the current user. The device public/private key pair can be a public/private key pair generated when the account opening related application is enabled for the first time, and is stored in the TEE.

In some implementations, after the user public/private key pair is generated, the user public key in the user public/private key pair is stored in the TEE, and the user private key in the user public/private key pair is stored in the secure element, to prevent the user public/private key pair from being tampered with.

S220: Sign the user public key in the TEE by using a predetermined manufacturer private key, to obtain a user certificate. The manufacturer private key is a key stored in hardware of the terminal device by a manufacturer of the terminal device on a production line of the terminal device. The manufacturer private key can be stored in the TEE of the terminal device. Therefore, the obtained user certificate can include the user public key and a first signature obtained after the user public key is signed by using the manufacturer private key.

S230: Sign opening information in the secure element by using the user private key corresponding to the user public key. The opening information is generated based on device information of the terminal device.

In a case, the device information can include but is not limited to a device name, a device identifier, a device model, a manufacturer identifier, etc. of the terminal device. The device identifier is used to uniquely identify the terminal device, for example, can be embodied as a medium access control (MAC) address. The device model can indicate a device type (a computer, a smartphone, a payment card, or a smart watch) and a specific model in this type. The device information is pre-stored in the TEE of the terminal device, so that the device information is prevented from being tampered with.

In some feasible methods, the terminal device can generate the opening information in the TEE or the secure element based on the device information. Further, the terminal device performs hash value calculation on the opening information in the secure element by using a predetermined hash algorithm, to obtain a hash value corresponding to the opening information. The terminal device encrypts the hash value by using the user private key stored in the secure element, to obtain a digital signature for the opening information.

S240: Generate an opening request in the TEE based on at least the user certificate and signed opening information. The opening request is used to request a server that opens an account to open an account. The opening request can include the user certificate and the signed opening information. The user certificate is used to indicate that the terminal device that opens an account is a real physical terminal device, and the signed opening information is used to assist the server in verifying whether the opening information is accurate, complete, and authentic. After the verification is passed, the server can generate an opening reply by using the opening information, and feed back the opening reply to the terminal device. The terminal device can open an account based on the opening reply.

In some embodiments of this specification, S240 can include the following steps 11 and 12:

Step 11: Obtain a manufacturer digital certificate, where the manufacturer digital certificate includes a manufacturer public key corresponding to the manufacturer private key.

Step 12: Generate the opening request based on the user certificate, the manufacturer digital certificate, and the signed opening information.

In the embodiments, to better improve account opening credibility, the manufacturer digital certificate is obtained in the TEE in S140. The manufacturer digital certificate includes the manufacturer public key corresponding to the manufacturer private key. The manufacturer digital certificate is stored in the terminal device by the manufacturer of the terminal device on the production line of the terminal device. In a case, the manufacturer digital certificate is stored in the TEE of the terminal device. In some implementations, the manufacturer digital certificate can be a certificate issued by a certificate authority (CA) to the manufacturer of the terminal device. The manufacturer digital certificate is used to verify authenticity of the user certificate.

After obtaining the user certificate, the manufacturer digital certificate, and the signed opening information, the terminal device generates the opening request in the TEE based on the user certificate, the manufacturer digital certificate, and the signed opening information. The opening request includes the user certificate, the manufacturer digital certificate, and the signed opening information. Subsequently, after the opening request is sent to the server, the server can first verify authenticity of the manufacturer digital certificate. After the verification on authenticity of the manufacturer digital certificate is passed, the server verifies authenticity of the user certificate by using the manufacturer public key in the manufacturer digital certificate. Correspondingly, credibility of the opening request is higher, and therefore, credibility of the opening account is higher. Verifying authenticity of the manufacturer digital certificate can be verifying authenticity of the manufacturer digital certificate based on a manufacturer root public key obtained by the server from the manufacturer of the terminal device.

S250: In the TEE, generate an opening request packet based on the opening request, and send the opening request packet to the server that opens an account, so that the server opens an account for the current user based on the opening request packet.

In some implementations, the terminal device can generate the opening request packet in the TEE based on the opening request and a predetermined packet format. The predetermined packet format is a format that is set based on a data transmission protocol between the terminal device and the server that opens an account. Further, the opening request packet is sent to the server that opens an account. Correspondingly, the server opens an account for the current user based on the opening request packet.

In the embodiments, the opening information is signed in the secure element with highest security by using the user private key, so that accuracy and integrity of the opening information are ensured, and the opening information is prevented from being stolen and tampered with. In the TEE of the terminal device with relatively high security, the user public key is signed by using the predetermined manufacturer private key, to obtain the user certificate, the opening request packet is generated based on the signed opening information, and the opening request packet is sent to the server that opens an account in the TEE. The user certificate in the opening request packet can indicate that the opening request packet is from a real physical device produced by a device manufacturer, and processes of generating and sending the opening request packet are completed in the TEE and the secure element, so that a loss of related information in the packet generation process is reduced, and credibility of the opening request packet is improved to some extent, thereby improving credibility of opening a corresponding account.

To prevent the opening request packet from being intercepted and the device information in the opening request packet from being stolen during transmission, in some embodiments of this specification, the opening request packet can be encrypted for transmission. Correspondingly, S250 can include the following steps 21 to 23:

Step 21: Encrypt the opening request in the TEE by using a symmetric key, to obtain an encrypted opening request.

Step 22: Encrypt the symmetric key by using a server public key of the server, to obtain a first encrypted key after encryption.

Step 23: Generate the opening request packet based on the encrypted opening request and the first encrypted key. The opening request packet includes the encrypted opening request and the first encrypted key. In a case, the first encrypted key can be added to a packet header of the opening request packet.

In some feasible methods, to better improve confidentiality of the opening request, before step 21, the method can further include the following step: The symmetric key is randomly generated in the TEE by using a predetermined random key generation method. Using a random symmetric key to encrypt the opening request in an account opening procedure can increase difficulty in stealing related information in the opening request packet to some extent, and improve confidentiality and security of the related information in the opening request packet. The predetermined random key generation method can include but is not limited to symmetric encryption algorithms such as the Data Encryption Standard (DES), the Triple Data Encryption Algorithm (3DES), and the Advanced Encryption Standard (AES).

The server public key can be a key agreed upon between the terminal device and the server, and can be predetermined in the terminal device, or can be delivered to the terminal device when needed by the terminal device. Correspondingly, in some feasible methods, before step 22, the method can further include the following steps: A predetermined server public key agreed upon with the server is obtained in the TEE; or the server public key is obtained from the server that opens an account by using a predetermined key negotiation algorithm. The predetermined key negotiation algorithm can be any current algorithm that can be used for key negotiation. This is not limited in the embodiments.

The symmetric key is encrypted by using the server public key, to obtain the first encrypted key after encryption. The opening request packet is generated based on the predetermined packet format, the encrypted opening request, and the first encrypted key. The opening request packet is sent to the server. Subsequently, the server generates an opening reply packet based on the opening request packet, and feeds back the opening reply packet to the terminal device. The terminal device can open an account based on the opening reply packet.

In the embodiments, based on existing general capabilities of the manufacturer of the terminal device and a lightweight data processing method, a highly reliable data encryption solution similar to a one-device one-key solution is implemented, and confidentiality and integrity in a data transmission process are ensured.

In some embodiments of this specification, after step S250, the method further includes the following steps 31 and 32:

Step 31: Obtain the opening reply packet that is fed back by the server based on the opening request packet.

Step 32: Open an account based on the opening reply packet. The opening reply packet can include information indicating the terminal device to open an account. Correspondingly, the terminal device opens an account based on the information in the opening reply packet.

In some implementations, the terminal device can obtain, by using the TEE, the opening reply packet that is fed back by the server based on the opening request packet, and further open an account in the TEE based on the opening reply packet.

To ensure security of the opening reply packet and further to ensure account opening credibility, information included in the opening reply packet that is fed back by the server to the terminal device is encrypted information. In some feasible methods, the opening reply packet includes an opening reply ciphertext encrypted by using the symmetric key and a second encrypted key obtained by encrypting the symmetric key by using a server private key corresponding to the server public key.

Correspondingly, step 32 can include the following steps 321 to 323:

Step 321: Decrypt the second encrypted key by using the server public key, to obtain a symmetric key.

Step 322: When it is determined that the symmetric key obtained through decryption is the same as the symmetric key generated in advance in the TEE, decrypt the opening reply ciphertext by using the symmetric key, to obtain an opening reply plaintext.

Step 323: Open an account based on the opening reply plaintext.

In the implementations, after obtaining the opening reply packet by using the TEE, the terminal device parses the opening reply packet to obtain the opening reply ciphertext and the second encrypted key in the opening reply packet, and decrypts the second encrypted key by using the server public key, to obtain the symmetric key. It is determined whether the symmetric key obtained through decryption is the same as the symmetric key generated in advance in the TEE. When it is determined that the symmetric key obtained through decryption is the same as the symmetric key generated in advance in the TEE, it can be considered that the opening reply packet is a packet actually delivered by the server. Correspondingly, in the TEE, the terminal device decrypts the opening reply ciphertext by using the symmetric key, to obtain the opening reply plaintext, and further opens an account based on the opening reply plaintext.

In the above-mentioned account opening procedure, data transmitted between the server and the terminal device are encrypted and decrypted by using the randomly generated symmetric key and a server public/private key pair, and subsequent steps are performed after each party confirms authenticity of a data sender and authenticity and integrity of data, so that account opening credibility is improved.

Figure 3:
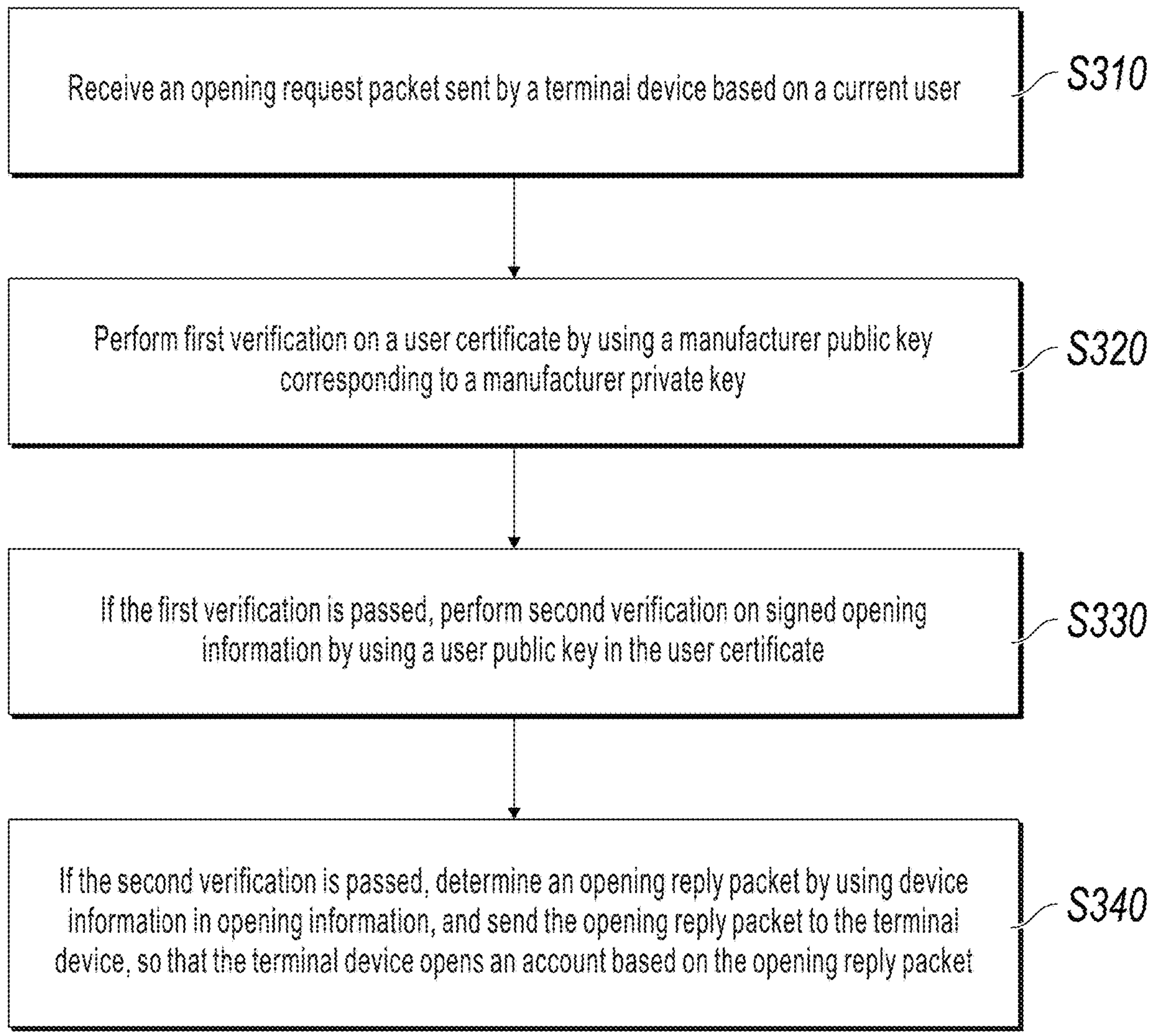
FIG. 3 is another schematic flowchart illustrating an account opening method, according to some embodiments of this specification.

Corresponding to the above-mentioned method embodiments, FIG. 3 is another schematic flowchart illustrating an account opening method, according to this specification. The method is applied to a server, and the server can be implemented by any device, apparatus, platform, server, or device cluster that has computing and processing capabilities. The server is configured to open an account for a terminal device that sends an opening request packet. In some embodiments of this specification, the method can include the following steps S310 to S340:

S310: Receive the opening request packet sent by the terminal device based on a current user. The opening request packet includes an opening request, the opening request includes a user certificate and signed opening information, the user certificate is obtained by signing a user public key of the current user by using a manufacturer private key predetermined in the terminal device, the signed opening information is obtained by signing opening information by using a user private key corresponding to the current user, and the opening information is generated based on device information of the terminal device;

In a case, the terminal device includes a trusted execution environment (TEE) and an encryption hardware-based secure element. The above-mentioned opening request packet, the opening request, and the user certificate can be generated in the TEE of the terminal device, and the signed opening information can be generated in the secure element of the terminal device. In some implementations, the opening request packet is sent by the terminal device to the server by using the TEE.

The current user is a user an account is to be opened for. In a case, the current user can be a user of an account opening related application disposed in the terminal device. The terminal device can further include a rich execution environment (REE), and the account opening related application can run in the REE. For example, the account opening related application can be ALIPAY Wallet. Correspondingly, the current user can be an ALIPAY user, and the account can be a hardware wallet account that needs to be opened for the ALIPAY user in ALIPAY Wallet. ALIPAY Wallet can run in the REE of the terminal device.

It is worthwhile to note that for generation processes of the opening request packet, the opening request, the user certificate, and the signed opening information, references can be made to the generation processes described in the above-mentioned embodiments of the account opening method applied to the terminal device, and details are omitted here for simplicity.

In some implementations, the server can communicate with one or more terminal devices, and receive opening request packets sent by the one or more terminal devices; and then perform, for each opening request packet, the account opening method procedure provided in the embodiments of this specification. After receiving the opening request packet, the server parses the opening request packet to obtain the user certificate and the signed opening information in the opening request packet.

S320: Perform first verification on the user certificate by using a manufacturer public key corresponding to the manufacturer private key. In some implementations, the manufacturer public key corresponding to the manufacturer private key can be predetermined for the server. Correspondingly, after receiving the opening request packet, the server obtains, for the terminal device from a local predetermined storage area, the manufacturer public key corresponding to the manufacturer private key, and then performs first verification on the user certificate by using the manufacturer public key. In other implementations, after receiving the opening request packet, the server can download, for the terminal device, the manufacturer public key from a server corresponding to a manufacturer of the terminal device, and then perform first verification on the user certificate by using the manufacturer public key.

S330: If the first verification is passed, perform second verification on the signed opening information by using the user public key in the user certificate. In this step, if the first verification is passed, it can indicate that the user public key in the user certificate is authentic and complete, and can indicate that the terminal device is a real physical device produced by a manufacturer. Correspondingly, it can be determined that the opening request packet is sent by a real physical terminal. Further, the server parses the user certificate to obtain the user public key in the user certificate, and performs second verification on the signed opening information by using the user public key.

In some implementations, if the first verification fails, it can be considered that the user public key in the user certificate is tampered with, or the terminal device is not a real terminal device produced by a corresponding manufacturer. Subsequently, the server can no longer perform subsequent steps. In a case, the server can further send, to the terminal device, information indicating that the terminal device cannot open an account.

S340: If the second verification is passed, determine an opening reply packet by using the device information in the opening information, and send the opening reply packet to the terminal device, so that the terminal device opens an account based on the opening reply packet. In this step, if the second verification is passed, it can indicate that the opening information is authentic and complete. Correspondingly, the server parses the opening information to obtain the device information, and further, determines the opening reply packet by using the device information and sends the opening reply packet to the terminal device.

In the embodiments, the server verifies the opening request packet sent by the terminal device twice, to determine that the terminal device is a real physical terminal device and that the opening request packet is a real packet sent by the terminal device, and then feeds back the opening reply packet to the terminal device, so that credibility of opening an account by the terminal device is improved to some extent.

In some embodiments of this specification, the opening request further includes a manufacturer digital certificate, and the manufacturer digital certificate includes the manufacturer public key corresponding to the manufacturer private key. Correspondingly, S320 can include the following steps 41 and 42:

Step 41: Perform third verification on the manufacturer digital certificate by using an obtained manufacturer root public key. The manufacturer root public key can be locally predetermined by the server, or can be obtained through downloading from the server corresponding to the manufacturer of the terminal device after the server receives the opening request packet sent by the terminal device.

Step 42: If the third verification is passed, perform first verification on the user certificate by using the manufacturer public key.

To better prove that the terminal device is a real physical terminal and ensure account opening credibility, the opening request can further include the manufacturer digital certificate. The manufacturer digital certificate includes the manufacturer public key corresponding to the manufacturer private key. Correspondingly, the server performs third verification on the manufacturer digital certificate by using the obtained manufacturer root public key. If the third verification is passed, it indicates that the manufacturer digital certificate is credible, in other words, the manufacturer is credible, and further, the manufacturer digital certificate is parsed to obtain the manufacturer public key in the manufacturer digital certificate, and first verification is performed on the user certificate by using the manufacturer public key.

In some embodiments of this specification, the opening request is an encrypted opening request obtained through encryption by using a symmetric key, and the opening request packet further includes a first encrypted key obtained by encrypting the symmetric key by using a server public key.

Correspondingly, before S320, the method can further include the following steps 51 and 52:

Step 51: Decrypt the first encrypted key by using a server private key corresponding to the server public key, to obtain the symmetric key.

Step 52: Decrypt the encrypted opening request by using the symmetric key, to obtain an opening request plaintext.

To ensure security of the packet during transmission, the opening request is an encrypted opening request obtained through encryption by using the symmetric key, and correspondingly, the opening request packet can further include the first encrypted key obtained by encrypting the symmetric key by using the server public key. The server parses the opening request packet to obtain the first encrypted key and the encrypted opening request in the opening request packet, decrypts the first encrypted key by using the predetermined server private key corresponding to the server public key, to obtain the symmetric key, further decrypts the encrypted opening request by using the symmetric key, to obtain the opening request plaintext, and further generates the opening reply packet based on the device information in the opening request plaintext.

In some embodiments of this specification, S340 can include the following steps 61 to 64:

Step 61: Determine an opening reply by using the device information.

Step 62: Encrypt the opening reply by using the symmetric key, to obtain an opening reply ciphertext.

Step 63: Encrypt the symmetric key by using the server private key, to obtain a second encrypted key after encryption.

Step 64: Form the opening reply packet based on the opening reply ciphertext and the second encrypted key.

To ensure security of the packet during transmission, in step S340, the server first determines the opening reply by using the device information, and encrypts the opening reply by using the symmetric key obtained by decrypting the opening request packet, to obtain the opening reply ciphertext. The server encrypts the symmetric key by using the server private key, to obtain the second encrypted key after encryption. Further, the server assembles a packet based on a predetermined packet format, the opening reply ciphertext, and the second encrypted key, to form the opening reply packet. The server sends the opening reply packet to the terminal device, so that the terminal device opens an account based on the opening reply packet. Encrypting the packet by using the symmetric key included in the opening request packet and the server private key and then transmitting the encrypted opening reply packet ensure security of the packet during transmission and improve account opening credibility.

Specific embodiments of this specification have been described above, and other embodiments fall within the scope of the appended claims. In some situations, the actions or steps described in the claims can be performed in an order different from the order in the embodiments and the desired results can still be achieved. In addition, processes described in the accompanying drawings do not necessarily require a specific order or a sequential order shown to achieve the desired results. In some implementations, multitasking and parallel processing are also possible or may be advantageous.

Figure 4:
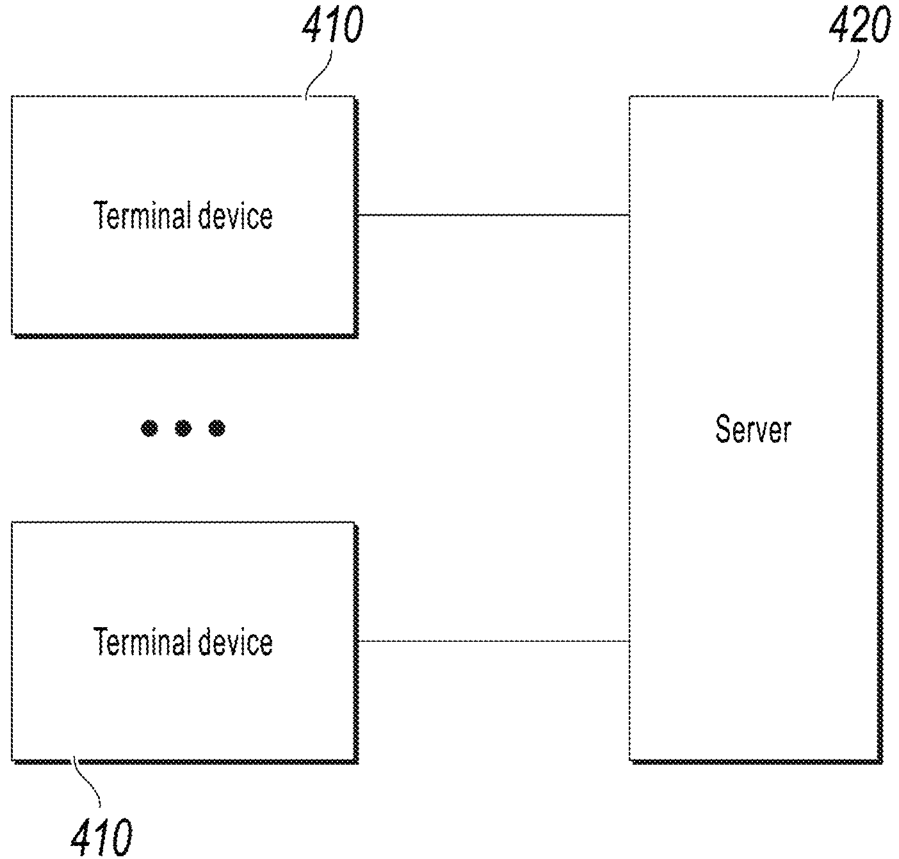
FIG. 4 is a schematic diagram illustrating a framework of an account opening system, according to some embodiments of this specification.

Corresponding to the above-mentioned method embodiments, some embodiments of this specification provide an account opening system 400. A schematic block diagram of the system is shown in FIG. 4. The system includes a terminal device 410 and a server 420. The terminal device 410 is configured to perform the above-mentioned terminal device-side account opening method. The server 420 is configured to perform the above-mentioned server-side account opening method. In some implementations, the server can open accounts for a plurality of terminal devices 410.

Figure 5:
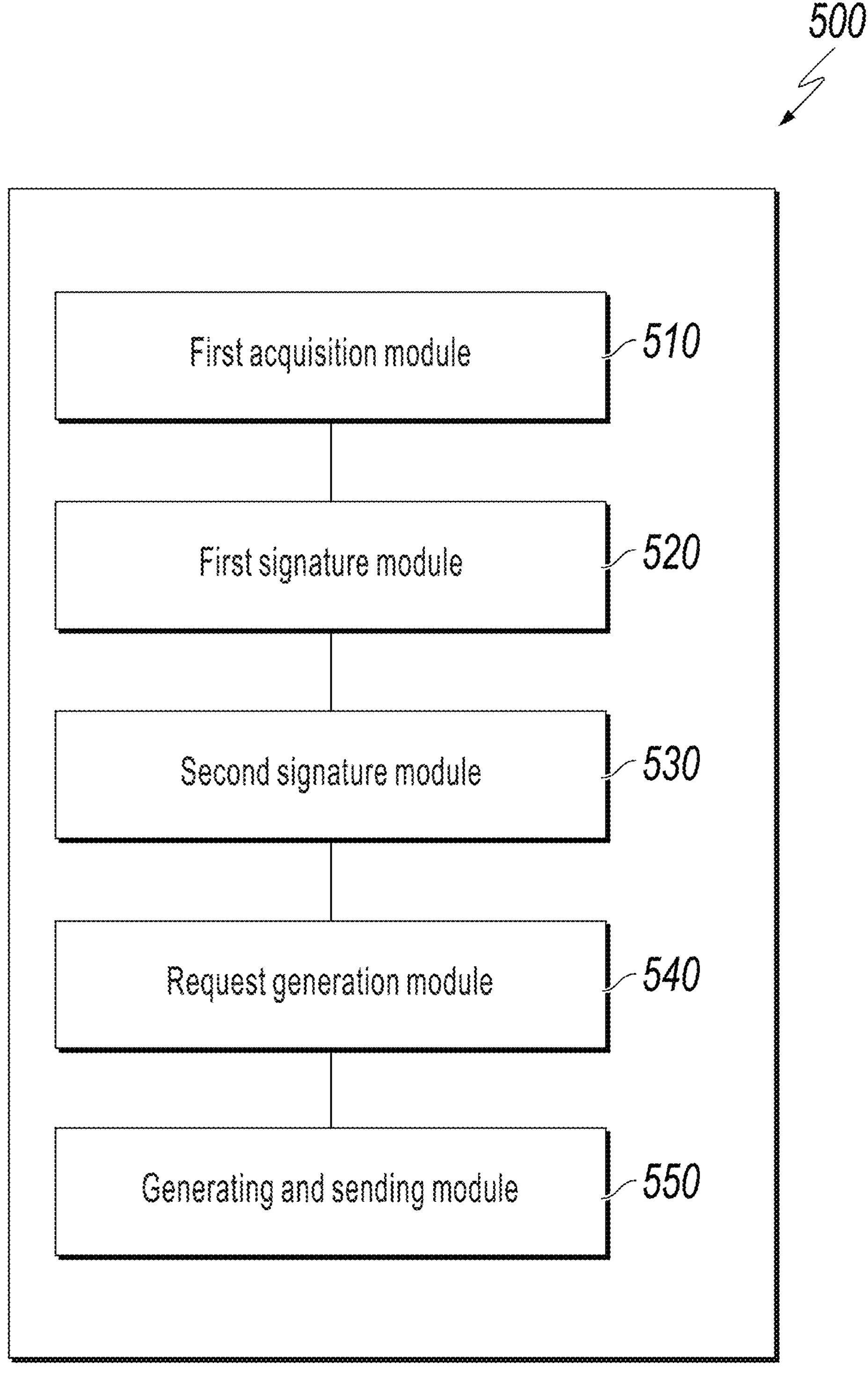
FIG. 5 is a schematic diagram illustrating a framework of an account opening apparatus, according to some embodiments of this specification.

Corresponding to the above-mentioned method embodiments, some embodiments of this specification provide an account opening apparatus 500, applied to a terminal device. The terminal device includes a trusted execution environment (TEE) and an encryption hardware-based secure element. A schematic block diagram of the apparatus is shown in FIG. 5. The apparatus includes: a first acquisition module 510, configured to obtain a user public key of a current user in the TEE; a first signature module 520, configured to sign the user public key in the TEE by using a predetermined manufacturer private key, to obtain a user certificate; a second signature module 530, configured to sign opening information in the secure element by using a user private key corresponding to the user public key, where the opening information is generated based on device information of the terminal device; a request generation module 540, configured to generate an opening request in the TEE based on at least the user certificate and signed opening information; and a generating and sending module 550, configured to: in the TEE, generate an opening request packet based on the opening request, and send the opening request packet to a server that opens an account, so that the server opens an account for the current user based on the opening request packet.

In some feasible methods, the first acquisition module 510 is specifically configured to: in the TEE, generate a corresponding user public/private key pair by using a device public/private key pair generated in advance and a user identifier of the current user, where the user public/private key pair includes the user public key and the user private key corresponding to the user public key.

In some feasible methods, the request generation module 540 is specifically configured to: obtain a manufacturer digital certificate, where the manufacturer digital certificate includes a manufacturer public key corresponding to the manufacturer private key; and generate the opening request based on the user certificate, the manufacturer digital certificate, and the signed opening information.

In some feasible methods, the generating and sending module 550 is specifically configured to: encrypt the opening request in the TEE by using a symmetric key, to obtain an encrypted opening request; encrypt the symmetric key by using a server public key of the server, to obtain a first encrypted key after encryption; and generate the opening request packet based on the encrypted opening request and the first encrypted key.

In some feasible methods, the apparatus further includes: a key generation module (not shown in the figure), configured to randomly generate the symmetric key by using a predetermined random key generation method.

In some feasible methods, the apparatus further includes: a second acquisition module (not shown in the figure), configured to obtain a predetermined server public key agreed upon with the server from the TEE; or obtain the server public key from the server by using a predetermined key negotiation algorithm.

In some feasible methods, the apparatus further includes: a third acquisition module (not shown in the figure), configured to obtain an opening reply packet that is fed back by the server based on the opening request packet; and an account opening module (not shown in the figure), configured to open an account based on the opening reply packet.

In some feasible methods, the opening reply packet includes an opening reply ciphertext encrypted by using the symmetric key and a second encrypted key obtained by encrypting the symmetric key by using a server private key corresponding to the server public key; and the account opening module is specifically configured to: decrypt the second encrypted key by using the server public key, to obtain a symmetric key; and when it is determined that the symmetric key obtained through decryption is the same as the symmetric key generated in advance in the TEE, decrypt the opening reply ciphertext by using the symmetric key, to obtain an opening reply plaintext; and open an account based on the opening reply plaintext.

Figure 6:
FIG. 6 is a schematic diagram illustrating a framework of an account opening apparatus, according to some embodiments of this specification.
Figure 6:
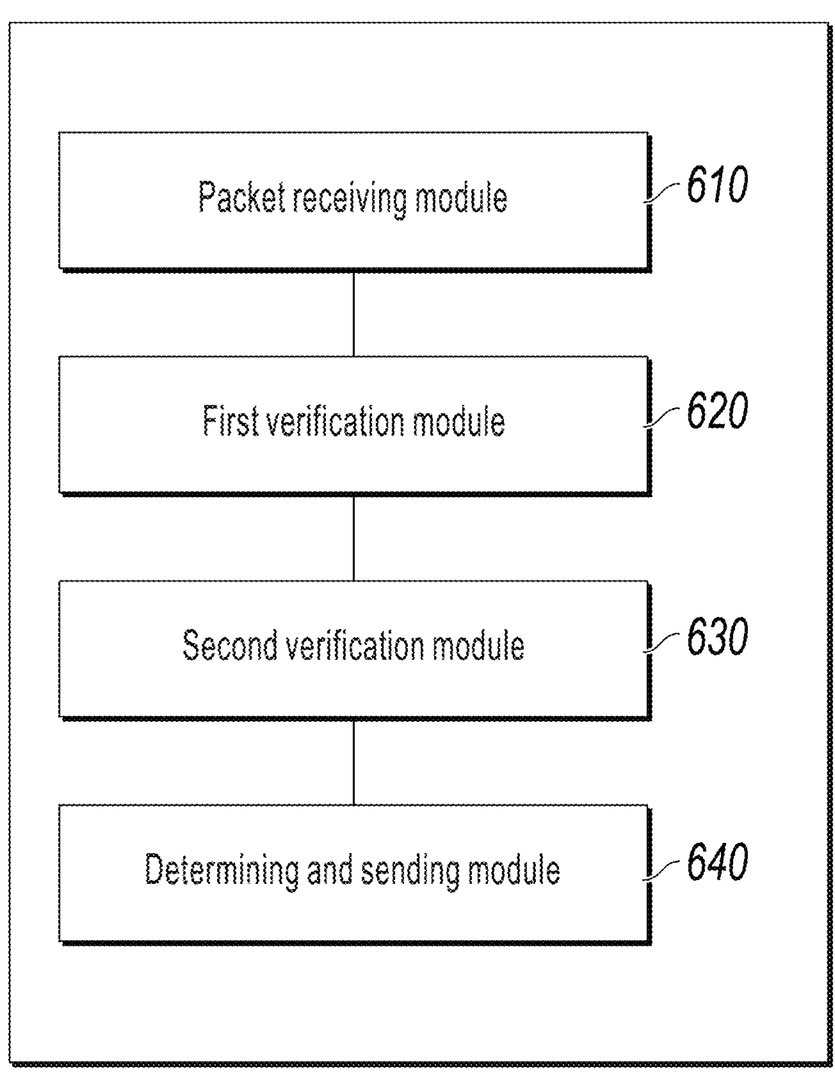

Corresponding to the above-mentioned method embodiments, some embodiments of this specification provide an account opening apparatus 600, applied to a server. The server is configured to open an account for a terminal device that sends an opening request packet. A schematic block diagram of the apparatus is shown in FIG. 6. The apparatus includes: a packet receiving module 610, configured to receive the opening request packet sent by the terminal device based on a current user, where the opening request packet includes an opening request, the opening request includes a user certificate and signed opening information, the user certificate is obtained by signing a user public key of the current user by using a manufacturer private key predetermined in the terminal device, the signed opening information is obtained by signing opening information by using a user private key corresponding to the current user, and the opening information is generated based on device information of the terminal device; a first verification module 620, configured to perform first verification on the user certificate by using a manufacturer public key corresponding to the manufacturer private key; a second verification module 630, configured to: if the first verification is passed, perform second verification on the signed opening information by using the user public key in the user certificate; and a determining and sending module 640, configured to: if the second verification is passed, determine an opening reply packet by using the device information in the opening information, and send the opening reply packet to the terminal device, so that the terminal device opens an account based on the opening reply packet.

In some feasible methods, the opening request further includes a manufacturer digital certificate, and the manufacturer digital certificate includes the manufacturer public key corresponding to the manufacturer private key; and the first verification module 620 is specifically configured to: perform third verification on the manufacturer digital certificate by using an obtained manufacturer root public key; and if the third verification is passed, perform first verification on the user certificate by using the manufacturer public key.

In some feasible methods, the opening request is an encrypted opening request obtained through encryption by using a symmetric key, and the opening request packet further includes a first encrypted key obtained by encrypting the symmetric key by using a server public key; and the apparatus further includes: a first decryption module (not shown in the figure), configured to: before first verification is performed on the user certificate, decrypt the first encrypted key by using a server private key corresponding to the server public key, to obtain the symmetric key; and a second decryption module (not shown in the figure), configured to decrypt the encrypted opening request by using the symmetric key, to obtain an opening request plaintext.

In some feasible methods, the determining and sending module 640 is specifically configured to: determine an opening reply by using the device information; encrypt the opening reply by using the symmetric key, to obtain an opening reply ciphertext; encrypt the symmetric key by using the server private key, to obtain a second encrypted key after encryption; and form the opening reply packet based on the opening reply ciphertext and the second encrypted key.

The above-mentioned apparatus embodiments correspond to the method embodiments. For detailed descriptions, references can be made to the descriptions of the method embodiments, and details are omitted here for simplicity. The apparatus embodiments are obtained based on the corresponding method embodiments, and have the same technical effects as the corresponding method embodiments. For detailed descriptions, references can be made to the corresponding method embodiments.

Some embodiments of this specification further provide a computer-readable storage medium. The computer-readable storage medium stores a computer program, and when the computer program is executed on a computer, the computer is enabled to perform the terminal device-side account opening method provided in this specification.

Some embodiments of this specification further provide a computing device, including a memory and a processor. The memory stores executable code, and when executing the executable code, the processor implements the terminal device-side account opening method provided in this specification.

Some embodiments of this specification further provide a computer-readable storage medium. The computer-readable storage medium stores a computer program, and when the computer program is executed on a computer, the computer is enabled to perform the server-side account opening method provided in this specification.

Some embodiments of this specification further provide a computing device, including a memory and a processor. The memory stores executable code, and when executing the executable code, the processor implements the server-side account opening method provided in this specification.

The embodiments of this specification are described in a progressive way. For same or similar parts of the embodiments, mutual references can be made to the embodiments. Each embodiment focuses on a difference from other embodiments. Particularly, storage medium embodiments and computing device embodiments are basically similar to the method embodiments, and therefore are described briefly. For related descriptions, references can be made to the descriptions in the method embodiments.

A person skilled in the art should be aware that in the above-mentioned one or more examples, functions described in the embodiments of this specification can be implemented by hardware, software, firmware, or any combination thereof. When being implemented by software, these functions can be stored in a computer-readable medium or transmitted as one or more instructions or codes in the computer-readable medium.

The objectives, technical solutions, and beneficial effects of the embodiments of this specification have been described in more detail with reference to the above-mentioned specific implementations. It should be understood that the above-mentioned descriptions are merely specific implementations of the embodiments of this specification and are not intended to limit the protection scope of this specification. Any modification, equivalent replacement, improvement, etc. made based on the technical solutions of this specification shall fall within the protection scope of this specification.

What is claimed is:

1. A computer-implemented method comprising:

obtaining, by a terminal device that comprises a trusted execution environment (TEE) and an encryption hardware-based secure element and that is separate from a server communicably connected to the terminal device, a user public key of a current user in the TEE;

signing, by the terminal device and in the TEE of the terminal device, the user public key by using a manufacturer private key to obtain a user certificate;

signing, in the encryption hardware-based secure element, opening information by using a user private key corresponding to the user public key to obtain signed opening information, wherein the user private key and the user public key form a user public/private key pair generated based at least on a user identifier of the current user, and wherein the opening information is generated based on device information of the terminal device and is for opening an account;

generating, in the TEE, an opening request based on at least the user certificate and the signed opening information; and generating, in the TEE, an opening request packet based on the opening request; and sending the opening request packet to the server that opens the account for the server to open the account for the current user based on the opening request packet.

2. The computer-implemented method according to claim 1, wherein the obtaining a user public key of a current user comprises:

generating, in the TEE, the user public/private key pair by using a device public/private key pair generated in advance and the user identifier of the current user.

3. The computer-implemented method according to claim 1, wherein the generating an opening request comprises:

obtaining a manufacturer digital certificate, wherein the manufacturer digital certificate comprises a manufacturer public key corresponding to the manufacturer private key; and generating the opening request based on the user certificate, the manufacturer digital certificate, and the signed opening information.

4. The computer-implemented method according to claim 1, wherein the generating an opening request packet based on the opening request comprises:

encrypting the opening request in the TEE by using a symmetric key to obtain an encrypted opening request;

encrypting the symmetric key by using a server public key of the server to obtain an first encrypted key after encryption; and generating the opening request packet based on the encrypted opening request and the first encrypted key.

5. The computer-implemented method according to claim 4, further comprising:

randomly generating the symmetric key by using a predetermined random key generation computer-implemented method.

6. The computer-implemented method according to claim 4, further comprising:

obtaining a predetermined server public key agreed upon with the server from the TEE; or obtaining the server public key from the server by using a predetermined key negotiation algorithm.

7. The computer-implemented method according to claim 4, further comprising:

obtaining an opening reply packet that is fed back by the server based on the opening request packet; and opening the account based on the opening reply packet.

8. The computer-implemented method according to claim 7, wherein the opening reply packet comprises an opening reply ciphertext encrypted by using the symmetric key and a second encrypted key obtained by encrypting the symmetric key by using a server private key corresponding to the server public key; and the opening the account based on the opening reply packet comprises:

decrypting the second encrypted key by using the server public key to obtain a second symmetric key;

in response to determining that the second symmetric key obtained through decryption is the same as a symmetric key generated in advance in the TEE, decrypting the opening reply ciphertext by using the second symmetric key to obtain an opening reply plaintext; and opening an account based on the opening reply plaintext.

9. A computer-implemented method comprising:

receiving, by a server, an opening request packet sent by a terminal device based on a current user for opening an account, wherein:

the terminal device is separate from the server communicably connected to the terminal device, the opening request packet comprises an opening request, the opening request comprises a user certificate and signed opening information, the user certificate is obtained by signing a user public key of the current user by using a manufacturer private key on the terminal device separate from the server, the signed opening information is obtained by signing opening information by using a user private key corresponding to the current user, wherein the user private key and the user public key form a user public/private key pair generated based at least on a user identifier of the current user, and the opening information is generated based on device information of the terminal device;

performing first verification on the user certificate by using a manufacturer public key corresponding to the manufacturer private key;

in response to that the first verification is passed, performing second verification on the signed opening information by using the user public key in the user certificate; and in response to that the second verification is passed, determining an opening reply packet by using the device information in the opening information, and sending the opening reply packet to the terminal device for the terminal device to open the account based on the opening reply packet.

10. The computer-implemented method according to claim 9, wherein the opening request further comprises a manufacturer digital certificate, and the manufacturer digital certificate comprises the manufacturer public key corresponding to the manufacturer private key; and the performing first verification on the user certificate comprises:

performing third verification on the manufacturer digital certificate by using an obtained manufacturer root public key; and in response to that the third verification is passed, performing the first verification on the user certificate by using the manufacturer public key.

11. The computer-implemented method according to claim 9, wherein the opening request is an encrypted opening request obtained through encryption by using a symmetric key, and the opening request packet further comprises a first encrypted key obtained by encrypting the symmetric key by using a server public key; and before the performing first verification on the user certificate, the computer-implemented method further comprises:

decrypting the first encrypted key by using a server private key corresponding to the server public key to obtain the symmetric key; and decrypting the encrypted opening request by using the symmetric key to obtain an opening request plaintext.

12. The computer-implemented method according to claim 11, wherein the determining an opening reply packet by using the device information in the opening information comprises:

determining an opening reply by using the device information;

encrypting the opening reply by using the symmetric key to obtain an opening reply ciphertext;

encrypting the symmetric key by using the server private key to obtain a second encrypted key after encryption; and forming the opening reply packet based on the opening reply ciphertext and the second encrypted key.

13. A computer-implemented system, comprising:

a terminal device that is separate from a server communicably connected to the terminal device and that comprises a trusted execution environment (TEE) and an encryption hardware-based secure element, wherein the terminal device is configured to perform one or more operations comprising:

obtaining, in the TEE, a user public key of a current user;

signing, by the terminal device and in the TEE of the terminal device, the user public key by using a manufacturer private key to obtain a user certificate;

signing, in the encryption hardware-based secure element, opening information by using a user private key corresponding to the user public key to obtain signed opening information, wherein the user private key and the user public key form a user public/private key pair generated based at least on a user identifier of the current user, and wherein the opening information is generated based on device information of the terminal device and is for opening an account;

generating, in the TEE, an opening request based on at least the user certificate and the signed opening information; and generating, in the TEE, an opening request packet based on the opening request; and sending the opening request packet to the server that opens the account for the server to open the account for the current user based on the opening request packet.

14. The computer-implemented system according to claim 13, wherein the obtaining a user public key of a current user comprises:

generating, in the TEE, the user public/private key pair by using a device public/private key pair generated in advance and the user identifier of the current user.

15. The computer-implemented system according to claim 13, wherein the generating an opening request comprises:

obtaining a manufacturer digital certificate, wherein the manufacturer digital certificate comprises a manufacturer public key corresponding to the manufacturer private key; and generating the opening request based on the user certificate, the manufacturer digital certificate, and the signed opening information.

16. The computer-implemented system according to claim 13, wherein the generating an opening request packet based on the opening request comprises:

encrypting the opening request in the TEE by using a symmetric key to obtain an encrypted opening request;

encrypting the symmetric key by using a server public key of the server to obtain an first encrypted key after encryption; and generating the opening request packet based on the encrypted opening request and the first encrypted key.

17. The computer-implemented system according to claim 13, further comprising the server, wherein the server is configured to perform second operations comprising:

receiving the opening request packet sent by the terminal device based on the current user for opening the account, wherein:

the opening request packet comprises the opening request, and the opening request comprises the user certificate and the signed opening information;

performing first verification on the user certificate by using a manufacturer public key corresponding to the manufacturer private key;

in response to that the first verification is passed, performing second verification on the signed opening information by using the user public key in the user certificate; and in response to that the second verification is passed, determining an opening reply packet by using the device information in the opening information, and sending the opening reply packet to the terminal device for the terminal device to open the account based on the opening reply packet.

18. The computer-implemented system according to claim 17, wherein the opening request further comprises a manufacturer digital certificate, and the manufacturer digital certificate comprises the manufacturer public key corresponding to the manufacturer private key; and the performing first verification on the user certificate comprises:

performing third verification on the manufacturer digital certificate by using an obtained manufacturer root public key; and in response to that the third verification is passed, performing the first verification on the user certificate by using the manufacturer public key.

19. The computer-implemented system according to claim 17, wherein the opening request is an encrypted opening request obtained through encryption by using a symmetric key, and the opening request packet further comprises a first encrypted key obtained by encrypting the symmetric key by using a server public key; and before the performing first verification on the user certificate, the second operations further comprise:

decrypting the first encrypted key by using a server private key corresponding to the server public key to obtain the symmetric key; and decrypting the encrypted opening request by using the symmetric key to obtain an opening request plaintext.

20. The computer-implemented system according to claim 19, wherein the determining an opening reply packet by using the device information in the opening information comprises:

determining an opening reply by using the device information;

encrypting the opening reply by using the symmetric key to obtain an opening reply ciphertext;

encrypting the symmetric key by using the server private key to obtain a second encrypted key after encryption; and forming the opening reply packet based on the opening reply ciphertext and the second encrypted key.

* * * * *